Nov. 2, 1943.  F. L. DUFFIELD  2,333,417
PRODUCTION OF IRON FROM IRON ORE
Filed Feb. 16, 1942
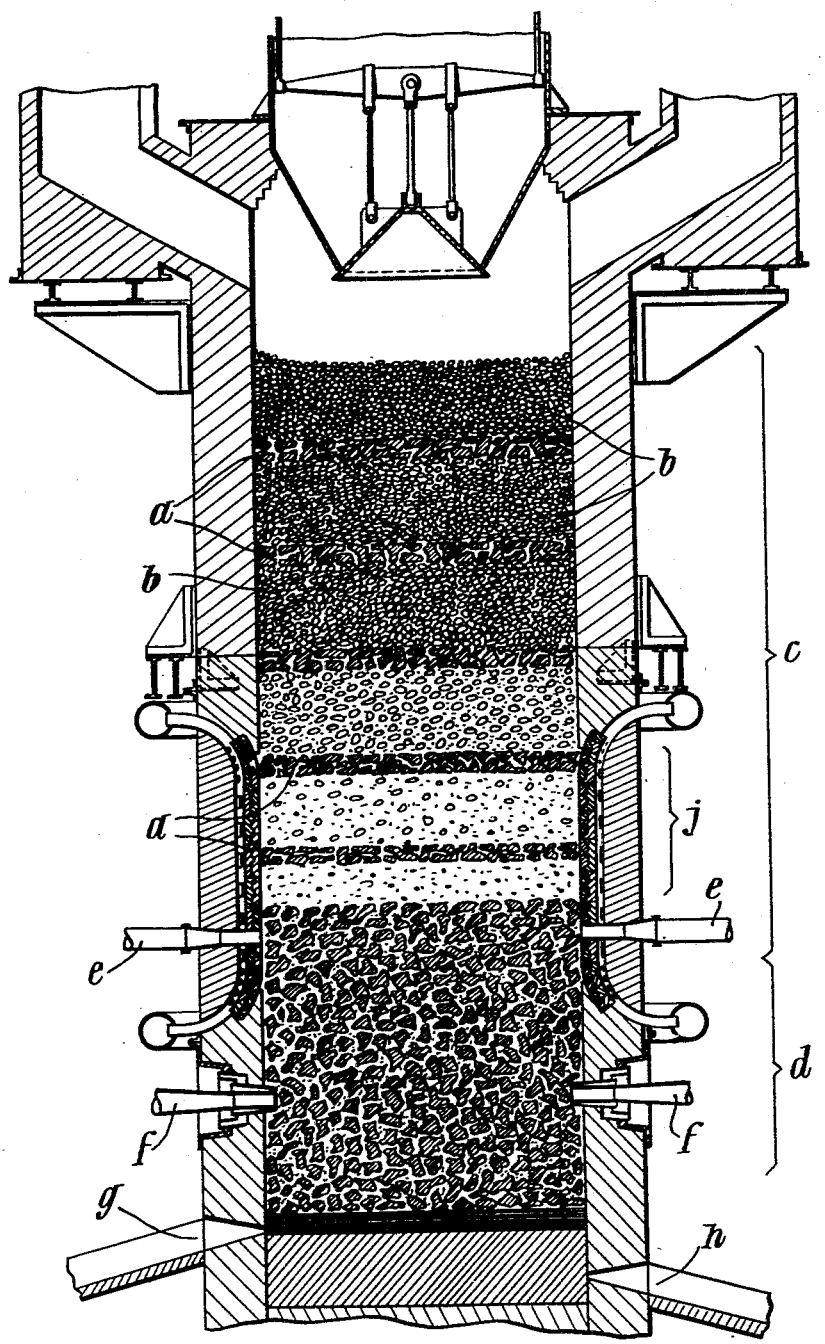
INVENTOR:
FREDERICK LINDLEY DUFFIELD
BY: Francis E. Boyce
ATTORNEY Patented Nov. 2, 1943

2,333,417

UNITED STATES PATENT OFFICE 2,333,417

PRODUCTION OF IRON FROM IRON ORE

Frederick Lindley Duffield, London, England

Application February 16, 1942, Serial No. 431,008
In Great Britain January 15, 1941

6 Claims. (Cl. 75—41)

This invention relates to the production of iron from iron ore.

In the smelting of iron ore to metallic iron as practised in blast furnace operation, the iron oxides of the ore are reduced to metallic iron by the gaseous reaction of carbon monoxide at temperatures below the fusion point of the ore and its contents, and the resultant metallic sponge iron and its accompanying gangue are thence melted in a lower zone of the furnace to cast (pig) iron and slag.

The method of heating which I hereinafter describe entails the reversing of this order or procedure by firstly melting the ore and thereafter reducing its molten oxides by contact with incandescent carbon.

This reversal of procedure presents the opportunity of securing the thermal benefits, as provided by my method of heating, of being able to utilise an oxidising heat for all those functions in the smelting of ore which do not metallurgically require reducing conditions.

The thermal benefit of an oxidising heat over a reducing heat is contained in the increased heat units liberated from carbon by complete combustion to carbon dioxide as in an oxidising heat against the heat units liberated from carbon by semi-combustion to carbon monoxide as in a reducing heat.

Those functions in the course of smelting which do not metallurgically require reducing conditions, but which are capable of being performed with greater thermal efficiency when an oxidising heat is being used, comprise the major proportion of the total heat requirements of smelting in the case of smelting low-grade ores, and nearly half the total heat in the case of high-grade ores. For instance, in the heating of a charge of iron ore, the expulsion of its contained moisture, the dissocation of its contained limestone releasing carbon dioxide gases, and the heating of iron oxides and contained gangue matter to their molten state can be effected more beneficially and economically by the use of complete combustion than by semi-combustion, and in the absence of any metallurgical consideration demanding reducing conditions, it is rational to use the more effective oxidising conditions.

Under standard methods as practised in the blast furnace, the metallurgical consideration demanding reducing conditions is, however, indispensable, since reduction is performed by carbon monoxide gas uniting with the oxygen of the iron oxides, forming carbon dioxide and metal, and whilst this reaction certainly tends to provide oxidising conditions to the extent of its fulfilment, that fulfilment is restricted by the intrusion of equilibrium conditions which admit of approximately only one-third of the total volume of carbon monoxide present effecting reduction of the iron oxides.

Therefore the resultant gases leaving a standard blast furnace after fulfilling gaseous reduction may contain two volumes of carbon monoxide and one volume of carbon dioxide derived from the carbon monoxide used in reduction.

It has been found that oxidising and reducing conditions capable of application to these respective smelting functions can be established in a single vertical furnace whereby the volumetric composition of the gases leaving such furnace are characterised by at least five parts of carbon dioxide (as the measure of fully utilised heat) to one part of carbon monoxide.

My method of establishing in an uninterrupted shaft of a single vertical furnace an oxidising zone superimposed on a reducing zone, whereby that portion of the smelting function which is more advantageously performed by oxidising conditions receives its requisite heat in this form in its course through the oxidising zone, is responsible for that saving in fuel consumption as represented by the more complete combustion of carbon within the furnace, as shown by the difference in the constitution of the exhaust gases.

For example, in a standard blast furnace, for every two units of carbon burned to $CO_2$, four units are burned only to $CO$, releasing thereby:

Two units of carbon to $CO_2$___ 16,200 Centigrade
    heat units
Four units of carbon to $CO$__ 9,720 Heat units
    —————
    25,920 Heat units =Heat release per unit of carbon
    =4,320 Heat units In my furnace, five units of carbon are burned to $CO_2$ and one unit to $CO$, releasing thereby:

Five units of carbon to $CO_2$___ 40,500 Heat units
One unit of carbon to $CO$_____ 2,430 Heat units
    —————
    42,930 Heat units =Heat release per unit of carbon
    =7,155 Heat units Therefore by my method of establishing in a single vertical furnace an oxidising zone superimposing a reducing zone, and by applying oxidising conditions to that portion of the smelting functions which is metallurgically amenable to oxidising heat conditions, a substantial saving in fuel consumption is effected.

Apart from a saving in fuel consumption, my method of applying heat ensures a much more rapid state of smelting by allotting those heat conditions, oxidising and reducing respectively, which are known to be consistent with the most efficient performance, to the series of metallurgical reactions involved.

Whereas gaseous reduction necessarily requires a long time factor to enable the gases to permeate the lumps of iron ore to effect reduction, molten oxides of iron are reduced to metal by contact with incandescent carbon almost instantaneously. And whereas the products of semi-combustion of carbon, viz., CO, do not contain that high temperature as do the products of complete combustion, therefore the sensible heating of the charge under the reducing conditions of the blast furnace is much slower in operation than the rapid heating obtained by more complete combustion as characterises the oxidising zone of my heating method.

By applying to known metallurgical requirements heat conditions, viz., oxidising or reducing, which are known to be most favourable to rapid heating and reaction respectively, my method of establishing those heat conditions in an uninterrupted single vertical furnace has been found to effect smelting in at least one-tenth of the time required in gaseous reduction as practised in the standard blast furnace.

It is well known that molten oxides of iron in contact with incandescent carbon cause reduction of the oxide to metal and the production of carbon monoxide gas, and attempts have been made to utilise this known reaction by melting in one chamber by an oxidising heat derived from combustion with air of the resultant carbon monoxide gas, and reducing the molten oxides in a separate chamber.

According to this invention however I provide a method for the production of iron from iron ore in a single shaft of a vertical furnace which consists in heating the ore to a temperature higher than its point of fusion in an oxidising zone to melt the ore by admission of air in that zone, and subsequently reducing the melted ore to iron in a lower zone of the same furnace by direct contact with carbon made incandescent by the introduction of air in that zone.

No reducing gases are introduced into the furnace but the carbon monoxide formed in the reducing chamber is burnt at a higher level in the oxidising chamber by the admission of air.

When carbon monoxide or hydrogen gas is introduced for the purpose of reducing molten oxides of iron, the prevailing temperature is such that equilibrium conditions are intensified in the direction of only approximately one-tenth of the carbon monoxide or hydrogen present being able to exert any reducing effect by reacting with the oxygen of the iron oxides. Equilibrium conditions do not apply to reduction of molten iron oxides by incandescent carbon combining with the oxygen of the ore to produce carbon monoxide, but the carbon monoxide thus produced at the high temperatures prevailing has little or no direct reducing power on the oxides.

In their ascensional course through the voids of the charge comprising ore and carbonaceous matter extending above the air admission level forming the oxidising zone, I have found that the oxidised products of complete combustion, viz., $CO_2$ and $H_2O$, are not subjected, except in a minor degree, to the endothermic reversion to their former state, (viz., CO and $H_2$), by contact with the pieces of lump carbonaceous matter accompanying the ore charge, provided that these products of combustion are of such volume in relation to the cross-sectional area of the shaft that their velocity is sufficiently high to prevent the requisite time contact for their reaction, viz., $CO_2+C=2CO$, or $H_2O+C=H_2+CO$.

The velocity of the gases as the medium of prevention of their reaction with the carbon present is assisted further by the small volume of the requisite carbonaceous matter in ratio to ore volume presenting insufficiency of carbonaceous mass to facilitate reaction.

I have found that the velocity of the gases in the circumstances is equivalent to that which arises from the total injection of air into the furnace for purposes of combustion being of such quantity that if it were admitted to an empty furnace (i. e., without containing any charge of ore or carbonaceous matter) at normal temperature and pressure would be sufficient to cause the velocity of such air through the cross-sectional area of such empty furnace from the level of the final air admission into the oxidizing zone to the top of the furnace to be at approximately 4 ft. per second, i. e., varying between 3 and 5 ft. per second according to the physical conditions of the ore and carbonaceous charge.

I have ascertained that the air admitted to the average standard blast furnace would be that volume to cause a velocity of such air through the cross-sectional area of such average empty furnace as follows:

| | Ft. per second |
|---|---|
| Through area of hearth | 2.5 |
| Through maximum area of bosh | 1.25 |

Whilst the total quantity of air required per ton of iron is approximately the same under my method as that required in the average blast furnace, the wide variance shown in the above theoretical example of the air velocity based on the same quantity of air admitted to a blast furnace and my furnace respectively is not maintained in the actual velocity of the resultant gases arising from such air admission in actual operation, since the volume of such gases from the same quantity of air is dependent upon the ratio of $CO:CO_2$. With a ratio of 1 CO to 6 $CO_2$, the gases containing 208 lb. oxygen, the volumes would be 355.5 cubic feet of CO and 2133 cubic feet of $CO_2$, making a total volume of 2488.5 cubic feet, (not including nitrogen), whereas with a ratio of 2 CO to 1 $CO_2$, the gases containing 208 lb. oxygen, the volumes would be 2311 cubic feet of CO and 1155.5 cubic feet of $CO_2$, making a total volume of 3466.5 cubic feet (not including nitrogen, which is the same in both instances).

Therefore by reason of the composition of the gases rising in my furnace according to my method having less volume than blast furnace gases from the same quantity of air, the actual rate of gas flow is not so great as that indicated by the respective measurements based on air flow through the respective furnace cross-sectional areas. The actual velocity of the gases arising from air admitted to my furnace under my method which represents an air velocity through the cross-sectional area of an empty furnace at 4 ft. per second has been found practical under working conditions.

To describe the manner in which I establish an oxidizing zone which superimposes a reducing zone in an uninterrupted shaft of a single vertical furnace for the purpose of applying these respective heat conditions to the melting and reduction of iron ore so that rapid operation is ensured by thus setting up conditions consistent with the known most efficient performance of melting and reducing, I will firstly describe the series of metallurgical stages the ore charge requires to undergo in its descent from the top charging level to the withdrawal of the molten iron and slag from their respective levels at the bottom part of the furnace.

It is assumed that the furnace is in operation as the result of having been started in the known manner common to the starting up of blast furnaces or melting cupolas.

The ore is in lumps, preferably about 1 to 2 inches in thickness. These lumps may be natural ore crushed to this size, or may be briquettes or sinter, respectively mechanically pressed or agglomerated by heat from fine ore. The briquettes may or may not contain a proportion of carbonaceous matter, dependent upon the state of ore rendering it advisable to preparatorily reduce it from the higher to the lower oxide in order to obtain a lower melting point.

Iron ore in its natural state mostly contains percentages of free and/or combined moisture, carbonates of lime, and magnesia, as well as sulphur and phosphates.

The ore, with that portion of lump carbonaceous matter, preferably coke or charcoal, which is required to furnish the means of reduction and the supply of requisite heat, together with any necessary fluxes, is charged at the top of the furnace, similar to blast furnace methods of charging. As the charge descends (as in its usual course by consumption of coke and the withdrawal of molten products) and enters the heat of the oxidising zone, the moisture is released as steam, the carbonates are dissociated with evolution of carbon dioxide gas, and a portion of the sulphur is burned to sulphur dioxide by excess oxygen in the combustion products of the oxidising zone, and the residual ore becomes molten and its molten condition superheated by the heat generation from complete combustion.

In contrast to this method of applying an oxidising heat, the heat generation from incomplete combustion would contain that less sensible heat as previously shown, necessitating more carbon consumption to produce the same amount of requisite heat. Further, the presence of more carbon accompanying the ore charge in conjunction with the reducing gases tends to the conversion of the carbon dioxide gases arising from the calcination of the carbonates of lime and magnesia to carbon monoxide, with a consumption of further carbon and a diminution of heat by the endothermic reaction involved.

The more intense heat of complete combustion in the oxidising zone under my method rapidly melts the oxides and residual gangue, and imparts a superheat to these molten products. This superheat of the molten charge, to the extent to which it exceeds the required free-running temperature of the ultimate molten iron and slag, forms a contributory means of supplying the heat requirements of the reducing zone upon entry of the superheated molten charge to this zone. The reduction of iron oxides by solid carbon entails an endothermic reaction, and additional to the superheat of the entering molten charge, further heat requires to be generated in the reduction zone.

Such additional heat may be supplied in either of two ways, viz: (1) By the admission of air at the bottom of the reducing zone ensuring its rapid semi-combustion to carbon monoxide in the relatively deep bed of incandescent carbonaceous matter immediately above the level of its admission. Whilst the carbon monoxide thus generated performs no sufficient part itself at the high temperatures obtaining at this level in the actual reduction of the oxides of iron, it has no retarding influence as would be the case with carbon dioxide on the rapid reduction of such iron oxides by the incandescent carbon of the carbonaceous pieces forming the bed with which it is in contact. (2) By electric current applied by any known method at the bottom level of the reducing zone.

The reducing zone is immediately above the crucible or hearth of the furnace, in which the molten iron and slag are collected in their separate layers formed by their respective specific gravities, such iron and slag being tapped in their molten state, according to usual practice.

The lump carbonaceous matter, preferably coke or charcoal, which accompanies the ore charge in the required proportion to effect the functions of reducing and supplying heat, descends from the charging level at the top of the vertical shaft of a single furnace to the reducing zone, in common with the general charge. In its descent through the oxidising zone only a negligible quantity of the solid carbon contained in such coke or charcoal is consumed, either by direct combustion by the air, or by solution through carbon dioxide reacting with such carbon to form carbon monoxide.

This practical freedom from carbon consumption is due to my method of heating whereby the air admitted at the level of the oxidising zone is satisfied for the most part by the carbon monoxide gas arising from the reduction zone, which such air entering the oxidising zone burns to carbon dioxide in preference to burning solid carbon, the high temperature carbon monoxide gas being more susceptible to combustion than solid carbon.

For the reasons previously described, viz., the high rate of passage of the resultant combustion products does not admit of a sufficiency of time contact of the carbon dioxide of such gases with the sparsely divided lumps of carbonaceous matter in the ore charge to admit, except in a minor degree, the reaction of $CO_2 + C = 2CO$. Therefore the lump carbonaceous matter fed to the furnace in its correct proportion to the functions it requires to perform, descends from the top of the shaft through the oxidising zone in its identifiable condition, with the exception already stated, to the reducing zone, where it forms a deep bed superimposing the molten metal and slag collected in the bottom of the furnace shaft which forms the hearth or crucible.

The furnace employed to effect the smelting by the reactions specified may be similar in design to an ordinary melting cupola supplied with two rows of tuyères at suitable levels, or one row of tuyères with electrodes to take the place of the lower row of tuyères.

An example of a suitable cupola furnace for carrying out my improved process is illustrated in the accompanying drawing, and as will be seen, the furnace is charged with layers of coke $a$ alternating with layers of iron ore $b$ the layers of coke being of less volume than the layers of ore. The oxidising zone of the furnace is the upper part thereof as indicated by the bracket $c$ and the reducing zone which is filled with coke is the lower part as indicated by the bracket $d$. $e, e$ are the upper tuyères through which air is supplied at the bottom level of the oxidising zone and $f, f$ are the lower tuyères through which air is admitted to the reducing zone in the lower part thereof.

$g$ is the slag tapping hole and $h$ is the iron tapping hole.

The bracket $j$ indicates approximately, that part of the oxidising zone where the iron ore becomes melted by the heat produced from the combustion of the carbonaceous matter in a gaseous atmosphere of carbon dioxide. The oxidizing zone is maintained at a higher temperature than the reducing zone.

The ore may consist of fine or crushed ore which has been briquetted. Carbonaceous matter may be included in the briquettes to effect reduction of the higher oxides to lower oxides, in which state ferrous silicate may be formed between the lower oxide FeO and $SiO_2$ contained in the ore. This formation serves the purpose of rapid melting by the lower melting temperature of ferrous silicate than that of the uncombined oxides of iron.

What I claim and desire to secure by Letters Patent is:

1. Method for the production of iron from iron ore in a single shaft of a vertical furnace which consists in heating the ore to a temperature higher than its point of fusion in an oxidising zone to melt the ore by the introduction of air in that zone, combustible materials in the form of reducing gases and carbon being present thereby to produce an oxidizing and highly heated zone, and subsequently reducing the melted ore to iron in a lower zone of the same furnace by direct contact with incandescent carbon, by the introduction of air in said lower zone.

2. Method according to claim 1 wherein the carbon monoxide formed in the reducing zone is burnt to carbon dioxide in the oxidising zone.

3. Method according to claim 1 wherein the oxidising zone maintains a higher temperature than the reducing zone.

4. Method for the production of iron from iron ore in a single shaft of a vertical furnace which consists in heating the ore to a temperature higher than its point of fusion in an oxidizing zone by admission to that zone of air in requisite quantity to provide for the complete combustion of carbon monoxide gases which arise into that zone from a lower zone wherein such gases are produced in the course of reducing the iron oxide of the melted ore to iron by direct contact with incandescent carbon and by admission of air to such lower zone for generation of heat by the semi-combustion of carbon.

5. Method according to claim 4 wherein the quantity of air admitted at the lower zone is such as to cause an ascensional gas velocity within the vertical shaft of the furnace consistent with the longer time factor required for the formation of carbon monoxide by air in contact with incandescent carbon, and the quantity of air admitted to the oxidizing zone is such as to cause an ascensional velocity of combustion products within the oxidizing zone of the vertical shaft whereby insufficient time is allowed for any substantial reduction of ascending oxidized gases by contact with the carbonaceous lumps contained in the charge during its descent through such oxidizing zone.

6. Method according to claim 4 wherein the oxidizing zone maintains a higher temperature than the reducing zone.

FREDERICK LINDLEY DUFFIELD.